Figure 1:
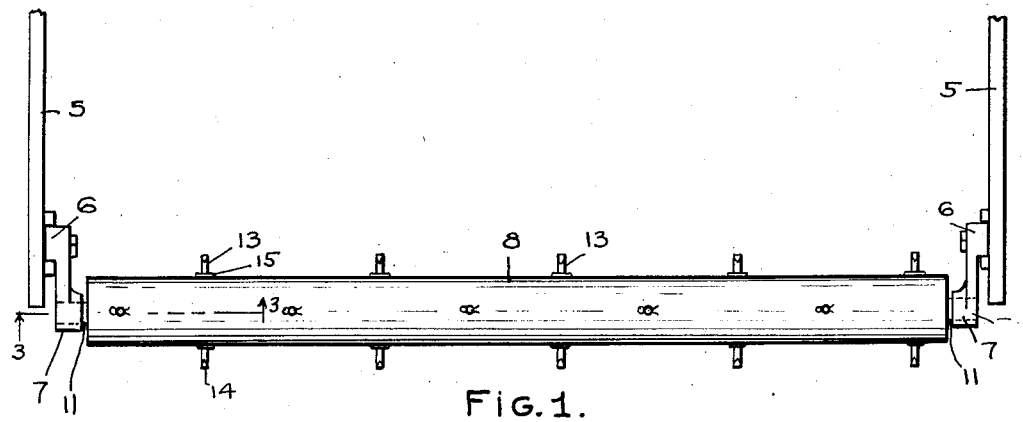

Sept. 1, 1959     J. J. YAFJACK     2,902,099
LAWN SCARIFIER
Filed Jan. 14, 1957

INVENTOR.
JOHN J. YAFJACK,
BY
ATTORNEY

2,902,099

Patented Sept. 1, 1959

2,902,099
LAWN SCARIFIER

John J. Yafjack, West Hollywood, Fla.

Application January 14, 1957, Serial No. 634,040

1 Claim. (Cl. 172—554)

This invention relates to lawn mowers or other ground or lawn treatment devices and has particular reference to a roller device that is provided with scarifying points for scarifying or agitating the earth as a means to facilitate the entry of fertilizer and the like to the root systems of the grass.

The invention contemplates a roller device to be substituted for the conventional traction roller of conventional lawn mowers and with the roller being provided with a plurality of radial prongs that dig into the lawn to a desired depth as the lawn mower is propelled in the usual manner.

It is a well known fact, that to improve the growth of grass, it becomes necessary that the soil be agitated or scarified in order that the fertilizer may be directed to the root systems and this invention contemplates means for scarifying the lawn and the earth in a manner that leaves a multiplicity of crevices or slots in the lawn as the device rolls thereover, aerating the lawn and providing openings through which the fertilizer may pass for direct application to the root systems. The aerating of the lawn is a recognized means for a healthy growth of grass, since plant life naturally requires a predetermined amount of oxygen periodically.

The invention contemplates a roller of tubular form that is provided with a plurality of prongs that have their ends shaped to a chisel form and whereby to facilitate the entry of the prongs into the ground while the lawn mower is propelled in the usual lawn cutting action.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
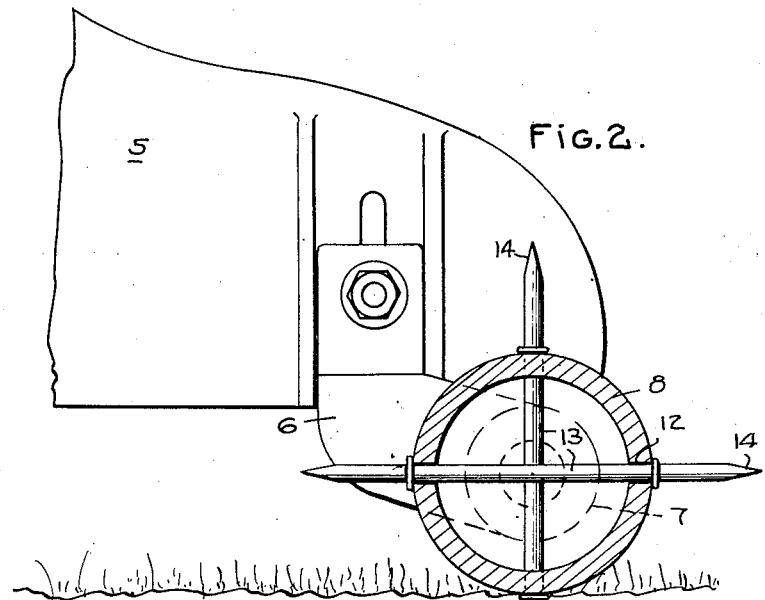
Figure 3:
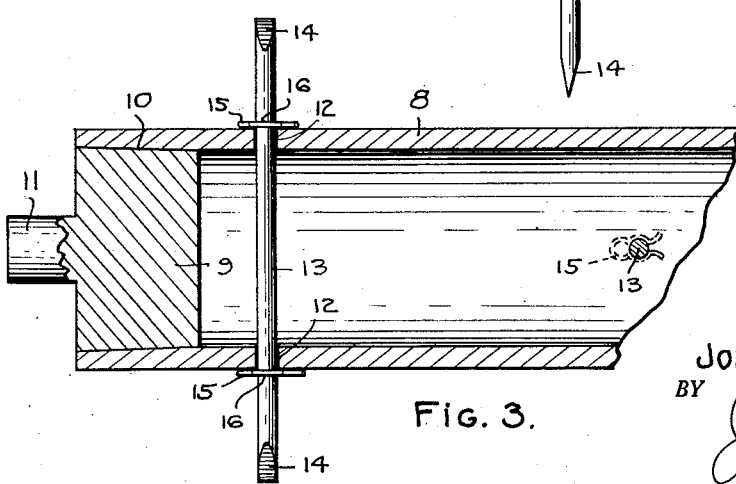
Figure 4:
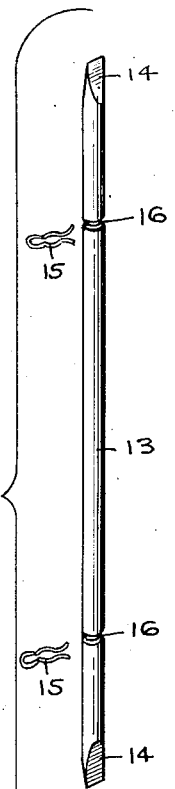

In the drawings:

Figure 1 is a top plan view of a roller constructed in accordance with the invention, with supporting end plates of the lawn mower being fragmentarily illustrated, Figure 2 is an enlarged transverse section through the roller, Figure 3 is a fragmentary longitudinal section through the roller, taken substantially on line 3—3 of Figure 1, and Figure 4 is a composite perspective view of prong forming means associated with the roller.

Referring specifically to the drawings, the numeral 5 designates the conventional end plates of a lawn mower, such as lawn mowers of the reel type. Adjustably connected upon the inner sides of the end plates 5 are bearing brackets 6 having journals 7. The journals 7 are obviously in axial alignment throughout the operation of the device.

Rotatably supported by the brackets 6, is an elongated cylindrical and preferably metallic roller 8. The roller 8 is open at its opposite ends and is closed by tapered plugs 9 having a pressed fit within the tapered seats 10 of the roller. The plugs 9 carry trunions 11 that have rotatable bearings in the journals 7. The roller 8 is freely rotatable under the influence of the motion of the lawn mower and the roller constitutes a traction device for the balanced support of the lawn mower.

The roller 8 at equidistantly spaced points has been transversely apertured at 12 and with each alternate aperture being at a right angle. There has been illustrated 10 groups of apertures, but it will be apparent that more or less apertures may be provided as may be deemed necessary for successfully carrying out the purpose of this invention. The apertures 12 pass through the side walls of the roller 8 and are in axial alignment. Engageable through each pair of aligned apertures 12, are cylindrical metallic rods 13. The rods 13 are beveled at their opposite ends to form chisel points 14. Each of the rods 13 are inserted through each pair of apertures 12 so that the chisel ends 14 project beyond the surface of the roller 8 substantially and identical distance. The means to prevent displacement of the rods 13 comprises spring clips 15 that are engaged within circumferential grooves 16 formed in the rods 13 and with the spacing of the grooves 16 being such that they lie in line with the outer face of the roller 8, and with the clips 15 in position, the rods are prevented from taking any appreciable movement with respect to the roller. The rods 13 may be quickly and easily removed and replaced by merely withdrawing the clips 15 and sliding the rod outwardly. This may become necessary when longer or shorter rods may be found desirable in the treatment of lawns of varying conditions of soil and the apparent necessity for varying depths of scarification.

In the use of the device, when the lawn is to be fertilized or aerated, the conventional roller is removed and replaced by the roller of this invention. The operator then proceeds to mow the lawn in the usual manner, and during such mowing action, the chisel pointed prongs continuously perforate and substantially slice the soil as the prongs enter and leave the ground and also agitates the root system for the subsequent application of the plant food. Thus, the lawn is effectively treated while the lawn is being mowed and requires no separate scarification or agitation. After the lawn has been treated, the roller may be removed and the conventional roller substituted therefor.

It will be apparent from the foregoing that a very novel and desirable means has been provided to effectively treat the lawn with a minimum of effort on the part of the operator. The scarifying roller most effectively loosens and perforates the soil, permitting the fertilizer to be readily washed into the ground for direct contact with the root systems, thus tending to eliminate dead grass, controls weeds, helps to avoid spongy lawns that have a tendency of creating a mass of exposed runners, such as that encountered in the southern area of the United States and recognized generally as St. Augustine grass. It may be found more desirable to first mow the lawn prior to the use of the spike roller, although this is not essential and it depends largely on the frequency of mowing. Obviously if the grass is permitted to grow for an unreasonable length of time, then the lawn should be mowed closely and the cuttings removed before the use of the scarifying roller. In soils that are unusually hard, it probably would facilitate the use of this device by either thoroughly watering the lawn in advance or using the device directly after a rainfall.

It is to be understood that the invention is not limited to the precise construction shown but that changes are contemplated as readily fall within the spirit of the invention as shall be determined by the scope of the subjoined claim.

Having described my invention, what I claim as new and desire to secured by Letters Patent is:

A lawn scarifying device for lawn mowers that comprises a ground engaging roller that is freely rotatable in bearings carried by end plates of the mower, the said rollers being of tubular form and open at its opposite end, tapered plugs for closing the ends of the roller, the said plugs being provided with projecting trunnions that engage the bearings, the roller being transversely apertured from side to side and with the apertures being equidistantly spaced apart for the major length of the rollers, the apertures being in rows and with the rows being at a right angle to each other, the apertures of the rows being in staggered relation, rods extending through the apertures and with their ends projecting outwardly from the surface of the roller substantially identical distance to form prongs, the oppositely projecting ends of each rod being beveled to form chisel points, each of the rods at points closely adjacent to the outer surface of the roller being circumferentially grooved and spring clips engaging the said grooves to prevent displacement of the rods, the said clips overlying the outer surface of the roller.

References Cited in the file of this patent

UNITED STATES PATENTS

| | | |
|---|---|---|
| 895,842 | Chambers, Jr. | Aug. 11, 1908 |
| 1,145,653 | Anderson | July 6, 1915 |
| 1,532,986 | Branson | Apr. 7, 1925 |
| 1,915,640 | Alsaker | June 27, 1933 |

FOREIGN PATENTS

| | | |
|---|---|---|
| 433,255 | Great Britain | of 1935 |